UNITED STATES PATENT OFFICE.

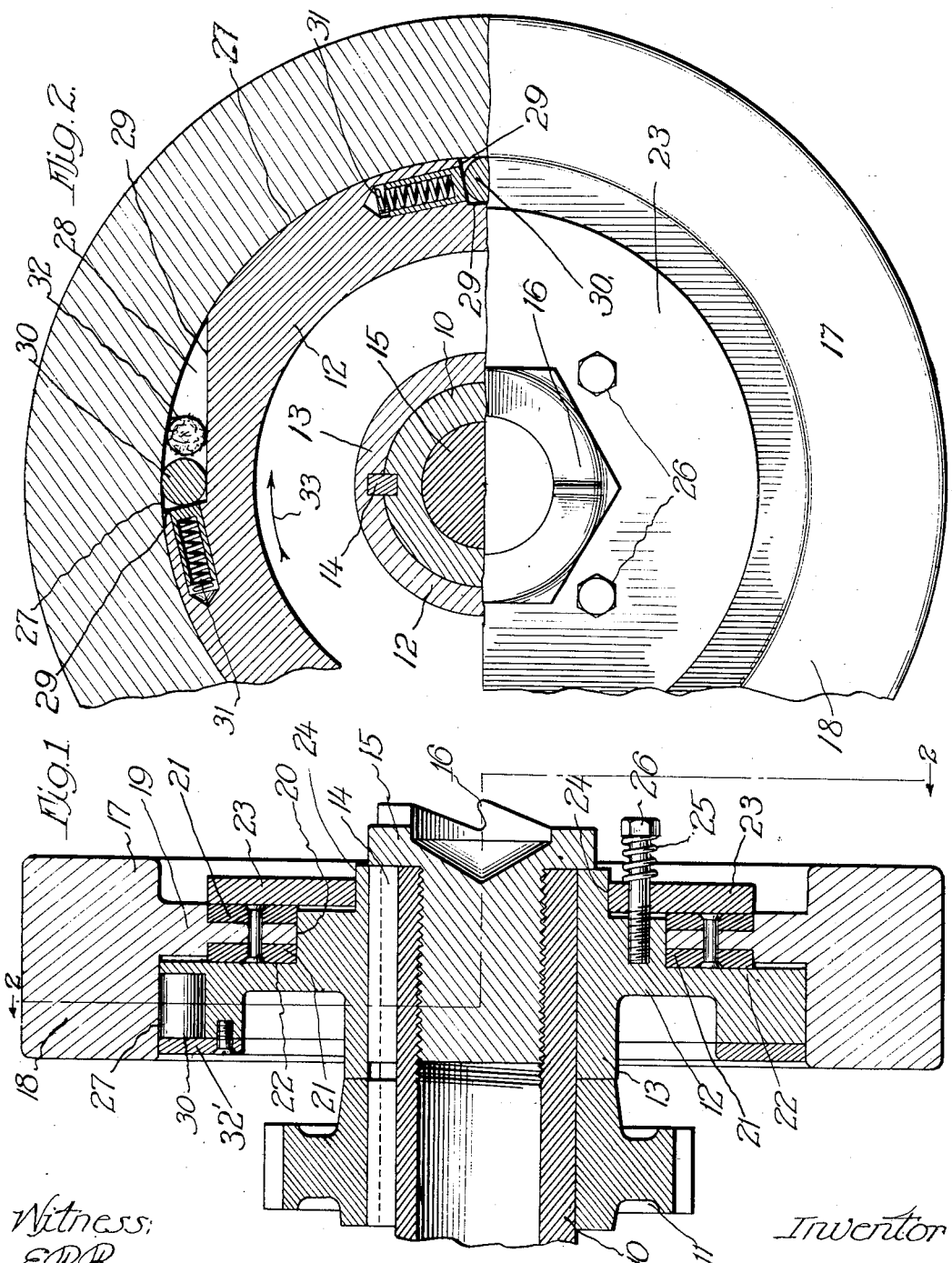

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

VIBRATION-DAMPING DEVICE.

1,273,952.     Specification of Letters Patent.     Patented July 30, 1918.

Application filed October 7, 1915. Serial No. 54,544.

*To all whom it may concern:*

Be it known that I, MILTON TIBBETTS, a citizen of the United States, and resident of Detroit, Wayne county, State of Michigan, have invented certain new and useful Improvements in Vibration-Damping Devices, of which the following is a specification.

This invention relates to hydrocarbon motors and particularly to multi-cylinder hydrocarbon motors in which a comparatively long crank shaft is employed. In such motors, with a flywheel mounted at one end, there is sometimes set up in the crank shaft what may be termed a "periodic torsional vibration", or torsional vibration which occurs at or around one or more particular speeds of the motor, due to an explosion or explosions in the cylinders synchronizing in point of time with the natural vibration period of the crank shaft. The present invention has for its salient object the provision of means for damping out or reducing such vibration, and while but one form of the invention is shown and described, it will be understood that this is illustrative only and various modifications may be made without departing from the spirit or scope of the invention.

Broadly, the invention consists of the combination of a crank shaft of a hydrocarbon motor and a flywheel connected thereto by means which carry the flywheel around frictionally in one direction but prevent relative rotation in the reverse direction, and the objects of the invention will be clearly understood from the following description taken with the drawings which form a part of this specification, and in which:—

Figure 1 is a longitudinal sectional view of a crank shaft and flywheel embodying the invention; and Fig. 2 is a part section and part elevation on the line 2—2 of Fig. 1.

Referring to the drawings, 10 represents the forward end of the crank shaft of a hydrocarbon motor, and 11 is a cam shaft driving gear secured thereon. A flange piece 12 has its hub 13 keyed to the forward end of the crank shaft as by the key 14, and the gear 11 and the flange piece 12 are retained on the crank shaft by a nut 15 screwed into the front end of the crank shaft and formed with suitable jaws 16 to coöperate with the usual starting crank, not shown.

An inertia member or flywheel 17 is formed with a heavy rim 18 and an inwardly extending flange 19, which latter is concentrically arranged and adapted to rotate upon a cylindrical part 20 of the flange piece 12. Thus the fly wheel 17 is properly centered upon the crank shaft.

There are two separately acting clutch connections between the crank shaft and the flywheel, and these consist of, first a yielding connection in the form of a friction clutch, and, second a one-way clutch which is shown of the usual roller type. The friction clutch causes the flywheel to be carried around or rotated with the crank shaft in the normal forward movement of the latter while in case of a sudden forward movement of the crank shaft such as that due to a torsional vibration, the friction clutch permits a slight slip between the shaft and the flywheel. The one-way clutch however, while it does not affect backward slip, positively prevents any forward slip of the flywheel relative to the crank shaft. Illustrative forms of these clutches will now be described in detail.

The flange 19 of the flywheel forms one of the plates of the friction clutch above referred to, and it is shown as lined on either side with a suitable asbestos lining 21. One of these linings contacts frictionally with a plate surface 22 formed on the flange piece 12, and the other contacts with a movable disk 23 which is mounted to slide on a cylindrical part 24 of the flange piece 12, and is spring pressed toward the surface 22 as by springs 25 mounted on bolts 26 which pass through the plate 23 and into the flange piece 12. In the form shown, there are four of these spring devices, but it is obvious that any desired number may be used. The bolts 26 are made adjustable for varying the tension of the springs 25.

On one side of the flywheel 17 the rim part 18 is formed with an inner cylindrical surface 27, which immediately surrounds and is adjacent to the periphery of the flange piece 12. On its periphery, said flange piece has several notches 28 cut therein, with walls 29 preferably straight and arranged at an angle to the periphery of said flange piece. Within each of these notches 28 is a roller 30, spring pressed as by a spring device 31, toward the contracted portion of the notch. A lubricating roller 32 of suitable absorbent material is also provided in contact with the roller 30. A ring 32' secured to the flange piece 12 forms a side cover for the several notches 28 and abuts the ends of the rollers 30 and 32 thereby retaining them in position.

It will be understood that as the flange piece 12 rotates in the direction of the arrow 33, there will be no tendency for the roller 30 to wedge between the surfaces 27 and 29, on the flywheel and flange piece respectively. However, any attempt of the flywheel 17 to run faster than the flange piece 12 will cause a wedging action of the roller 30 between the surfaces 27 and 29, and thus form a positive connection between the crank shaft and the flywheel, and prevent the latter from running ahead of the crank shaft.

It will be further understood that the friction clutch and the one-way or roller clutch will act independently and separately of each other, the friction clutch acting to carry the flywheel forward with the crank shaft, and the roller clutch preventing any overrunning action of the flywheel relative to the crank shaft. Thus the tension of the springs 25 may be so set that the action of the friction clutch will merely be sufficient to carry the flywheel 17 around with the crank shaft and have very little, if any, effect in actually dampening vibration. It will give to the flywheel, however, the required momentum that will permit it to react against the vibrating action of the crank shaft through the roller clutch connection. Or, if desired, the springs 25 may be initially adjusted with sufficient tension to assist materially in the dampening action, and thus coöperate in such action with the roller clutch, and in this case, when the lining pieces 21 become worn and the friction clutch becomes less effective in its dampening action, the greater burden of dampening will be taken up by the roller clutch.

Having thus described my invention, what I claim and desire to secure by Letters Patent, is:—

1. The combination with the crank shaft of a hydrocarbon motor, of a flywheel having a rim and an inwardly extending flange, a friction clutch between said flange and said shaft, and a roller clutch coöperating with the rim of said flywheel and said shaft.

2. The combination with a crank shaft having a flange, of a flywheel having a flange and mounted to rotate on said shaft, a friction connection between said flanges, and a roller clutch mounted in the flange on said crank shaft and coöperating with the rim of said flywheel.

3. The combination with the crank shaft of a hyrocarbon motor, of an inertia member, a yielding connection between said shaft and member, and a roller clutch connection between said shaft and member.

4. The combination with a crank shaft having a flange thereon and a disk mounted to rotate with the crankshaft, of a flywheel adapted to rotate on said shaft and provided with a rim and a flange, said flywheel flange extending between said crankshaft flange and said disk and having frictional engagement therewith, and roller clutch connections between said crankshaft flange and said rim.

5. The combination with a crankshaft having a flange piece thereon and a disk mounted to rotate with the crankshaft and means for yieldingly urging said disk toward said flange piece, of a flywheel adapted to rotate on said shaft and provided with a rim and a flange, the flywheel flange extending between said crankshaft flange piece and said disk and having a frictional engagement therewith, and roller clutch connections between said crankshaft flange piece and said rim.

6. The combination with a crankshaft having a flange and a disk thereon, means holding said disk against rotary movement independently of said flange and spring means surrounding said holding means urging said disk toward said flange of a flywheel adapted to rotate on said shaft and provided with a flange extending between said crankshaft flange and said disk and having frictional engagement therewith, and roller clutch connections for transmitting movement from said shaft to said flywheel.

7. The combination with a crankshaft having a flange piece keyed thereon, and a disk on said shaft, bolts holding said disk against rotary movement independenetly of said flange piece, and spring means surrounding said bolts urging said disk toward said flange piece, of a flywheel adapted to rotate on said shaft and provided with a flange extending between said crankshaft flange piece and said disk and having a yielding connection therewith for permitting yielding rotation in one direction, and roller clutch connection mounted in said crankshaft flange piece and bearing against said flywheel for providing positive rotation in the other direction.

In testimony whereof I affix my signature.

MILTON TIBBETTS.